United States Patent [19]

Armstrong et al.

[11] Patent Number: 4,928,263

[45] Date of Patent: May 22, 1990

[54] HYDROPHONES AND SIMILAR DEVICES

[75] Inventors: Bruce A. Armstrong; Robert G. Dunn, both of Dartmouth, Nova Scotia, Canada

[73] Assignee: Hermes Electronics Limited, Dartmouth, Nova Scotia, Canada

[21] Appl. No.: 308,512

[22] Filed: Feb. 10, 1989

[51] Int. Cl.⁵ ............................................. G01S 3/80
[52] U.S. Cl. .................................. 367/118; 367/157; 367/162; 367/179; 367/180; 33/366; 310/329; 310/337
[58] Field of Search .............. 367/157, 159, 165, 173, 367/179, 180, 118, 162; 310/329, 337, 800; 33/308, 365, 366, 391, 397

[56] References Cited

U.S. PATENT DOCUMENTS

| 3,603,921 | 9/1971 | Dreisbach | 340/10 |
|---|---|---|---|
| 3,870,989 | 3/1975 | Mallet | 340/6 R |
| 3,911,388 | 10/1975 | Crump et al. | 367/180 |
| 3,974,474 | 8/1976 | Izzo | 340/10 |
| 4,048,526 | 9/1977 | Taylor | 310/329 |
| 4,188,612 | 2/1980 | Kerr | 310/329 |
| 4,207,622 | 6/1980 | Miller | 367/126 |
| 4,208,733 | 6/1980 | Orieux | 367/125 |
| 4,208,737 | 6/1980 | Thompson et al. | 367/171 |
| 4,315,433 | 2/1982 | Edelman et al. | 310/329 |
| 4,333,342 | 6/1982 | Gilden et al. | 310/329 |
| 4,368,525 | 1/1983 | Obata et al. | 367/165 |
| 4,395,908 | 8/1983 | Shopland | 367/163 |
| 4,638,468 | 1/1987 | Francis | 367/153 |
| 4,679,178 | 7/1987 | Larsen et al. | 367/157 |
| 4,709,359 | 11/1987 | Loftin | 367/155 |
| 4,803,546 | 4/1974 | Leon | 310/329 |

FOREIGN PATENT DOCUMENTS

| 1008554 | 4/1977 | Canada . |
|---|---|---|
| 1108744 | 9/1981 | Canada . |
| 1202406 | 3/1986 | Canada . |
| 1241432 | 8/1988 | Canada . |
| 1348401 | 3/1974 | United Kingdom . |

Primary Examiner—Charles T. Jordan
Assistant Examiner—J. Woodrow Eldred
Attorney, Agent, or Firm—John W. Ross

[57] ABSTRACT

An accelerometer-based direction finding and ranging transducer such as a hydrophone uses piezoelectric ceramic as the active material. Orthogonally arranged accelerometers share an inertial mass and resonance control system and the accelerometers together with a pressure hydrophone and electronics are all housed within one pressure vessel.

23 Claims, 11 Drawing Sheets

HYDROPHONES AND SIMILAR DEVICES

BACKGROUND OF THE INVENTION

This invention relates to improvements in motion sensing transducers especially direction finding and ranging hydrophones.

Direction Finding And Ranging (DIFAR) hydrophones have been used in sonobuoys for nearly two decades to track submarines. A DIFAR hydrophone comprises two directional hydrophones, a pressure hydrophone, and electronics with compass. The receiving sensitivity of a directional hydrophone varies as the cosine of the azimuthal arrival angle of the sound; the two directional hydrophones are orthogonal to one another and form what is called a "crossed dipole". The receiving sensitivity of the pressure hydrophone is omnidirectional, i.e., the receiving sensitivity is at most a weak function of arrival angle. Arrival angles are measured from the reference axis, which is a line that coincides with the maximum receiving sensitivity of an arbitrarily chosen directional channel. This directional channel is the cosine channel; the other is the sine channel.

The crossed dipoles of early DIFAR hydrophones were obtained from four, or multiples of four, pressure hydrophones. Deficiencies of this type of DIFAR hydrophone are:

(1) excessive flow noise at low frequencies unless the distance between pressure hydrophones is large, (2) low acoustic sensitivity at low frequencies unless the distance between pressure hydrophones is large, (3) poor null depth (poor direction finding) at low frequencies unless the distance between pressure hydrophones is large, (4) poor phase and sensitivity tracking between directional channels, particularly when the operating ranges of temperature and hydrostatic pressures are large, (5) high cost, and (6) difficulties in packaging in a sonobuoy.

Improved versions of DIFAR hydrophones use other technologies, such as orthogonally mounted accelerometers within a pressure vessel. An acoustic pressure wave accelerates the pressure vessel, as it would a water molecule, producing an output in the accelerometers. The outputs of orthogonal accelerometers form the crossed dipole.

It is possible to build an accelerometer-based DIFAR hydrophone with two accelerometers, but superior performance is obtained with four accelerometers mounted symmetrically within the pressure vessel. The outputs of accelerometers at 180° intervals are combined to form the two directional channels. The use of four accelerometers, as compared with two, increases the acoustic sensitivity, and reduces the sensitivity to unwanted influences, e.g. pressure-induced deformations of the pressure vessel.

In the past, the accelerometers, the pressure hydrophone and the electronics were in the form of separate packages, interconnected with electrical wires and a mechanical suspension.

Accelerometer-based DIFAR hydrophones and other modern DIFAR hydrophones address, with varying degrees of success, the aforementioned deficiencies of the earliest DIFAR hydrophones. The present invention improves still further on these points.

SUMMARY OF THE INVENTION

Accordingly, objects of the present invention are to provide apparatus of the nature described above which produces improved sensitivity tracking and phase tracking between directional channels; to provide such equipment with a relatively high acoustic sensitivity while utilizing fewer sensing elements; and to produce such equipment with a fewer number of component parts thereby reducing cost while increasing reliability. Other objectives include the provision of equipment of the nature described above wherein flow noise and electrical noise are reduced, and further wherein the structure is such that thermally induced noise is reduced and wherein the electrical connection of the sensing elements is such as to minimize the electronic circuitry required to protect against induced voltages etc.

Accordingly the invention in one aspect provides a direction finding, motion sensitive transducer, such as a hydrophone, comprising: (a) an inertial mass; (b) means defining a mounting base; (c) resilient means interconnecting said inertial mass with said mounting base, said inertial mass extending along a symmetry axis when at rest, and said resilient means being adapted to permit the inertial mass to pivot or wobble relative to the mounting base in radial directions relative to said symmetry axis in response to and in accordance with the direction of components of acceleration of the mounting base which are transverse to the symmetry axis; (d) a plurality of sensing elements mechanically coupled to and arranged to respond to the pivoting or wobbling motion of the inertial mass relative to the mounting base, with said sensing elements being located so as to be responsive to and to produce outputs dependent on the directions of said acceleration components.

The inertial mass, the resilient means and the sensing elements together define resonant systems and means common to these items are provided for effecting damping of oscillations of such systems. The sensing elements preferably comprise stress-sensitive elements positioned to respond to the radially directed oscillations of the inertial mass relative to the mounting base.

In the preferred form of the invention the resilient means interconnecting the inertial mass with the mounting base comprises a neck portion centered with the symmetry axis and being sufficiently compliant in bending or flexure as to permit the inertial mass to pivot or wobble relative to the mounting base.

In a preferred embodiment the sensing elements are disposed in equally spaced relation around the symmetry axis and means are provided for effecting flexing of the sensing elements as the inertial mass pivots or wobbles relative to the mounting base. The sensing elements are preferably located on the mounting base and the means for effecting flexure comprises radially extending portions on the inertial mass each having means for contacting a respective one of the sensing elements such that the motions of the inertial mass are transmitted to the sensing elements. Resilient but relatively stiff sensing elements are provided enabling them to flex or deflect in response to these motions.

In a preferred form of the invention the sensing elements each include a piezo-electric layer secured to a resilient backing which is capable of flexing as the inertial mass pivots relative to the mounting base. The sensing elements are preferably arranged as two orthogonally arranged pairs with the sensors of each pair being of opposite polarity and being electrically connected in parallel.

The above-noted means for effecting damping of oscillations preferably includes a canister encompassing the inertial mass but spaced therefrom, such canister being fixed to the mounting base. A fluid of sufficient viscosity as to effect damping of the oscillations is located in the space between the canister and the inertial mass.

In an alternative version of the invention, the sensing elements are again disposed, in equally spaced relation around the symmetry axis but the resilient means differs from that described above in that it comprises a diaphragm-like structure to which both the inertial mass and the sensing elements are fixed such that the pivotal or wobbling motion of the inertial mass effects flexure and stressing of the sensing elements.

In the various embodiments of the invention there is typically provided a pressure vessel structure encompassing and enclosing the inertial mass, mounting base, resilient means and sensing elements for preventing ingress of water into the interior of the pressure vessel when in use. Typically, the pressure vessel structure includes a pair of opposed cup-shaped seamless bodies fixed and sealed to the mounting base. One of these seamless bodies preferably encompasses the inertial mass, the sensing elements and the damping means while the other one of the seamless bodies encloses a region for the mounting of electronic components.

Further features and advantages of the invention will become apparent from the following description of preferred embodiments of same with reference being had to the accompanying drawings and the appended claims.

DETAILED DESCRIPTION OF PREFERRED EMBODIMENTS

Figure 1:
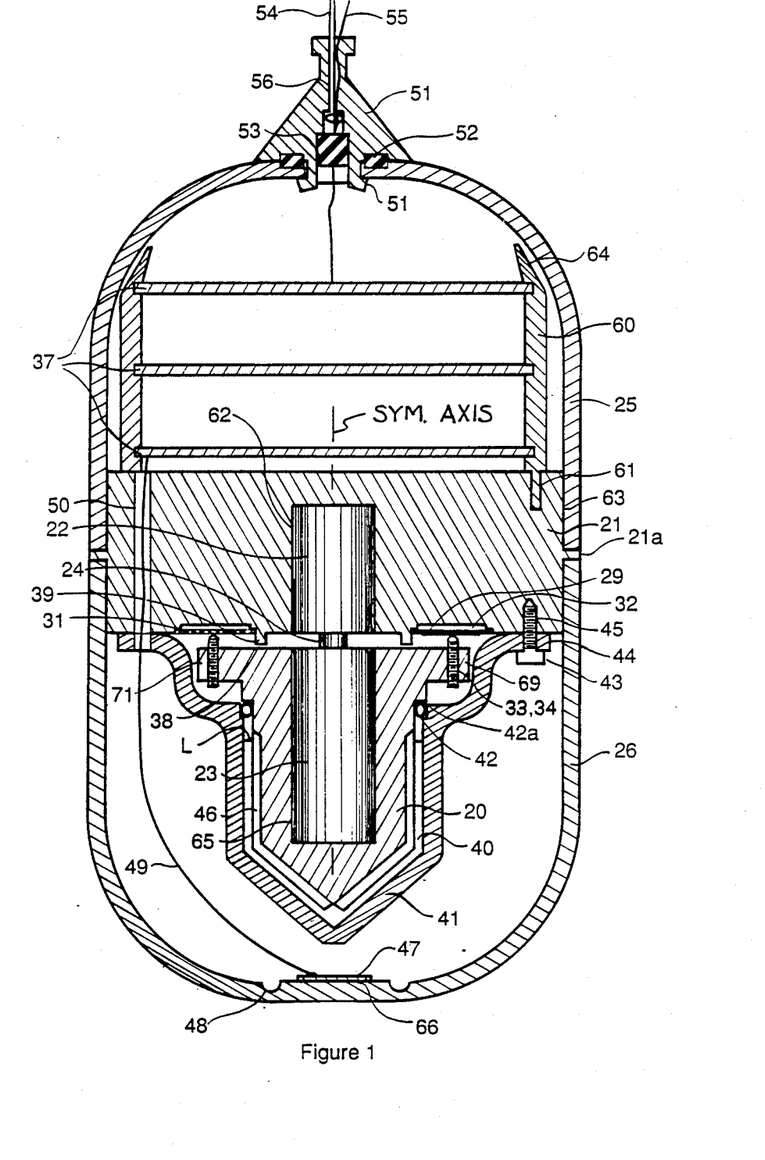
FIG. 1 is a longitudinal sectional view of a hydrophone according to a preferred embodiment in its normal operating position as taken along section line 1—1 shown in FIG. 2.
Figure 2:
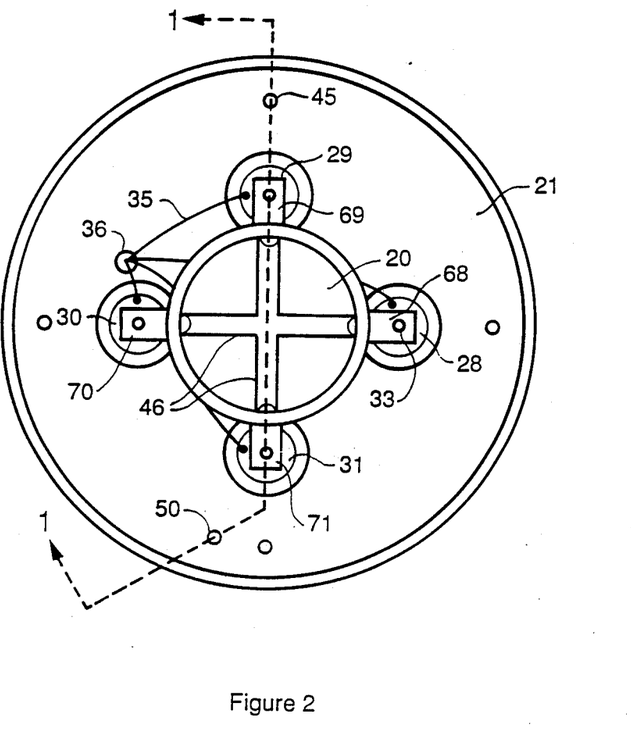
FIG. 2 is a plan view of the bottom of the hydrophone with the lower pressure vessel can and canister removed.
Figure 2A:
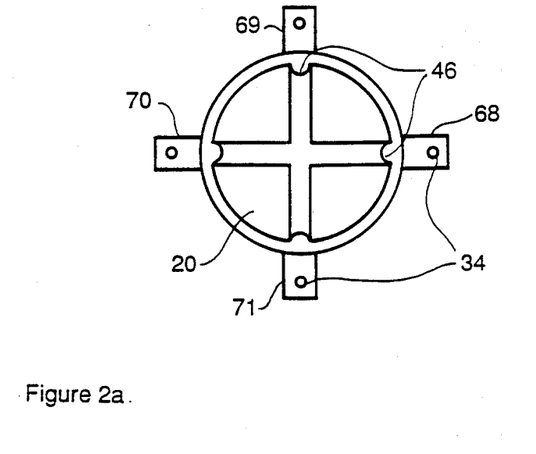
FIG. 2A is a further bottom plan view showing grooves in the inertial mass.
Figure 3:
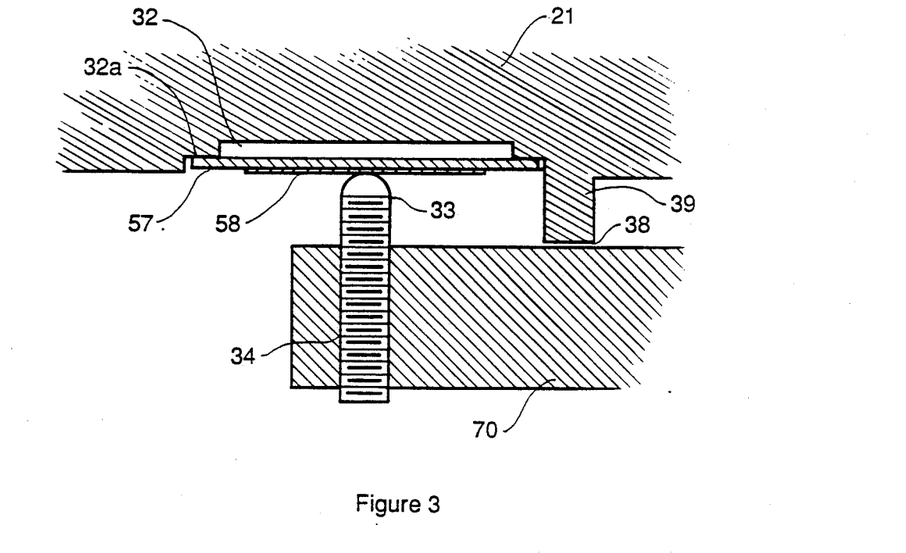
FIG. 3 is an expanded, radial section view in the vicinity of a sensing element.

The preferred embodiment of the hydrophone as shown in FIGS. 1–3 includes an inertial mass 20 (preferably of a non-ferrous, high density metal, such as zinc) of generally cylindrical shape but with a cone-shaped lower end portion, which inertial mass 20 is suspended from a relatively short, large diameter cylindrical metal (such as zinc) mounting base 21 by a strong aluminum mounting rod. The mass of mounting base 21 relative to the mass of inertial mass 20 is not critical. Typically, mounting base 21 will have a mass several times greater than that of inertial mass 20. Furthermore, the mass of mounting base 21 will be chosen to provide the desired degree of hydrophone buoyancy; (neutral buoyancy is desirable in some cases. The base 21 can be formed as a casting, partly hollowed out with stiffening ribs to provide the desired weight.) The mounting base 21, more importantly, provides at least sufficient stiffness so that it can co-operate with the mounting rod to help control the resonance of the inertial mass 20 as described below.

The mounting rod for the inertial mass 20 includes two elongated relatively large diameter rod sections 22, 23 that are snugly located in corresponding bores in the mounting base 21 and the inertial mass 20 and securely fastened thereto with thin adhesive layers 62 and 65 respectively; the mounting rod also has a short, relatively small diameter neck 24 located intermediate the sections 22, 23 that enables inertial mass 20 to effectively pivot or wobble in radial directions relative to a symmetry axis and relative to the mounting base 21. The symmetry axis extends along the longitudinal axis of the mounting rod and along the axis of symmetry of the inertial mass when they are in the rest (non-accelerated) position. Neck section 24 is of a length and thickness (and hence stiffness) as to keep the fundamental axial resonance frequency of the inertial mass 20 somewhat greater than the greatest acoustic frequency of interest, yet sufficiently compliant to permit the mass 20 to pivot about or wobble relative to the mounting base 21.

Opposed cup-like upper and lower aluminum pressure vessel cans 25 and 26 are fastened to cylindrical mounting base 21 with thin adhesive layers 63, which layers are sufficiently compliant to survive thermal shock, yet stiff enough to make a rigid connection. As shown, the mouths of cans 25 and 26 embrace the periphery of mounting base 21 and abut the intermediate annular ledge 21. In another (but very similar) embodiment of the invention, the upper and lower cans 25 and 26 are fastened to mounting base 21 with a mechanical interference fit and the thin adhesive layer 63 provides water integrity only. The pressure vessel cans 25 and 26 are of smooth, seamless, cup-shaped construction. It is noted that the elastic modulus of the material and the geometry of the cans must be such that any resonance frequency of the cans is somewhat higher than the highest acoustic frequency of interest.

The inertial mass 20 has four radially extending arms 68–71 in right angle (orthogonal) relation to each other, which arms are centered over four correspondingly positioned piezoelectric disc-shaped displacement-sensing elements 28–31, equidistant from the symmetry axis and which are located over four shallow pockets 32 in the mounting base 21. In particular, the peripheral portions of the sensing elements are supported on annular ledges 32a surrounding each pocket 32. The major central region of each sensing element 28–31 is located over the pocket and is hence capable of flexing in much the same way as does a diaphragm in response to varying loadings applied to the central region of the sensing element. Four round-nosed screws 33 passing through threaded holes 34 in the respective radial arms 68–71 couple the motions of the arms 68–71 to the sensing elements 28–31.

The ceramic displacement sensing elements 28–31 each comprise a thin, thickness-poled, piezoelectric ceramic disk 58, which is fastened to a thin metal disk 57 with solder or a thin adhesive layer. Metal disk 57 seats on the annular ledge 32a as described above. The face of the ceramic disk 58 that is in contact with the screw 33 has a small circular area in its center with no silver electrode, thereby providing electrical insulation between the screw 33 and the ceramic 58.

Figure 3A:
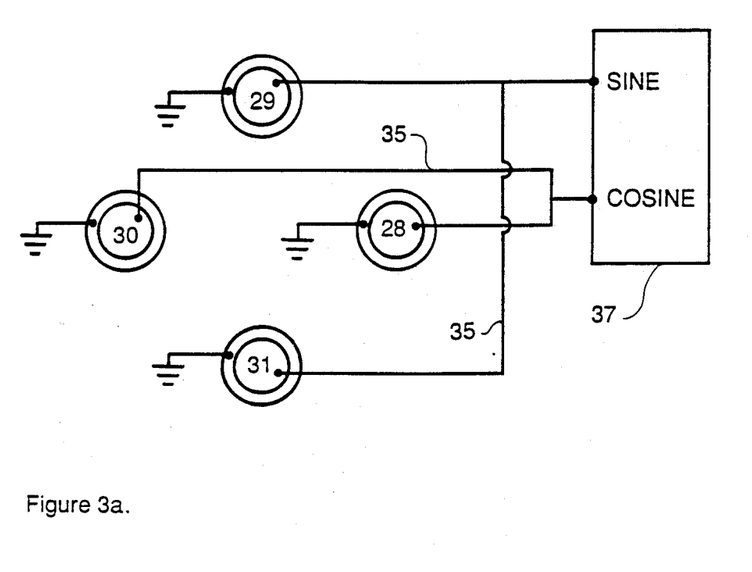
FIG. 3A is a schematic diagram showing the electrical connections to the sensing elements.

Sensing elements 28 and 30 are of opposite polarity and form the cosine channel; sensing elements 29 and 31 are of opposite polarity and form the sine channel. In other words, the diametrically opposed pairs of sensing elements provide orthogonally arranged directional channels. The electrical ground connections (FIG. 3A) to the sensing elements 28–31 are accomplished via the mounting base 21, which is in contact with the metal disks 57, which in turn are in contact with the ceramic discs 58. Signal wires 35 (FIGS. 2 and 3A) soldered to the ceramic disks 58 pass through a hole 36 in the mounting base 21 and are connected to the electronics 37. (The electronics package may be of a well-known or conventional design and hence is not described further here.) Sensing elements 28 and 30 are connected electrically in parallel as are sensing elements 29 and 31. The thin gaps 38 between the arms 68–71 and an annular snubber ring 39 formed on the under surface of mounting base 21 permit free pivotal movement of the arms 68–71 during acoustic operation, but limit the maximum displacement of the arms, thereby protecting the sensing elements 28–31 against excessive horizontal accelerations, as are sometimes encountered during transport or water-entry of an air-launched sonobuoy.

Figure 4:
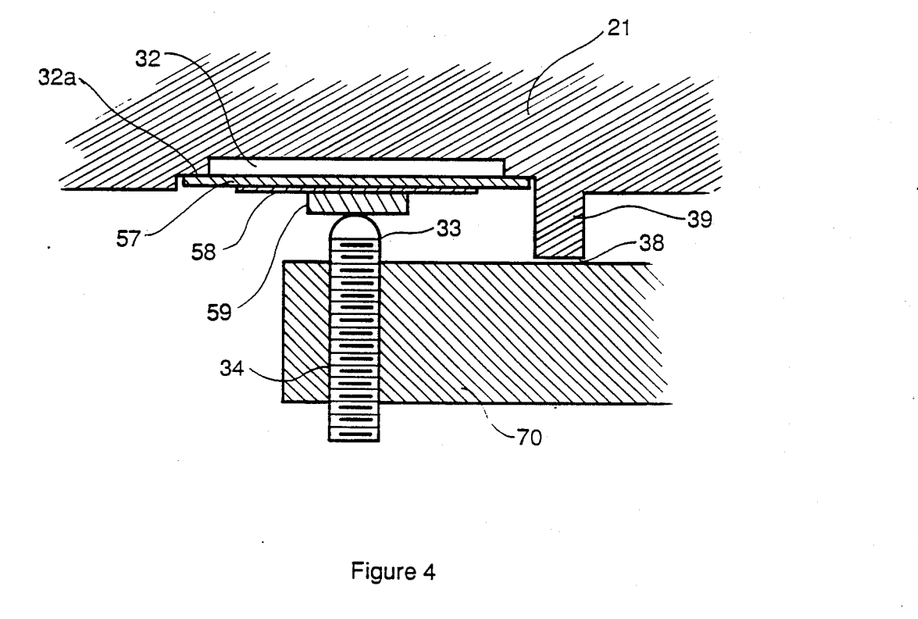
FIG. 4 is a view similar to that of FIG. 3 showing a modified embodiment.

FIG. 4 shows an alternative sensing element configuration. A stiff, electrically-insulating button 59 is placed between the screw 33 and the ceramic disk 58. The button 59 increases the acoustic sensitivity and obviates the unsilvered area on the ceramic disk 58, but increases the cost and introduces some manufacturing difficulties. The operation is otherwise the same as for the first configuration described.

The inertial mass 20 and the compliance of sensing elements 28 and 30 form a resonant system, as does the inertial mass 20 and the compliance of sensing elements 29 and 31. The resonance of these systems is determined by the moment of inertia of the wobbling inertial mass 20 about the neck 24, and the compliance of the respective diaphragm-like pairs of sensing elements 28, 30 and 29, 31. It follows that the resonance can be changed by changing the dimensions of the inertial mass 20 and the thickness and/or diameter of these sensing elements. A lower resonance increases the sensitivity of the hydrophone at low frequencies and decreases the sensitivity above the fundamental resonance of the system making the hydrophone more suitable for low frequency operation. The resonance frequencies of these resonant systems can be adjusted somewhat and made equal by adjustments of the screws 33.

Damping of the resonances is provided by a viscous liquid (preferably silicone oil) 40, which is contained within the volume bounded by the inertial mass 20, a canister 41 and the O-ring 42. The canister 41 is rigidly fastened to the underside of mounting base 21 by a plurality of self tapping screws 43 passing through holes 44 in a mounting flange portion of the canister and into the corresponding holes 45 in the mounting base 21.

The canister 41 corresponds generally in outline shape to the inertial mass 20 and is sized so that an annular gap exists between them at all points. The elastic modulus and geometry of the canister 41 and the attachment means are such that any resonance of the canister is higher than the highest acoustic frequency of interest.

An O-ring 42 is located and compressed between canister 41 and mass 20 and is seated at an annular step 42 on the inertial mass 20. The concentricity of the canister 41 with respect to the inertial mass 20 is assisted by the restoring force of the O-ring 42. The O-ring is of a lower durometer rubber so as not to unduly restrict the motion of the inertial mass although the exact hardness is not critical. The O-ring is made of a rubber resistant to the oil 40.

Grooves 46 extending lengthwise of and in the inertial mass 20 together with the conical shapes of the lower end portions of the inertial mass 20 and canister 41 hasten the transfer of oil 40 toward the conical end of the canister after the DIFAR hydrophone has been restored to its operating position (see FIG. 1) from an inverted position. It is noted here that the silicone oil 40 must have either an annular air space above it e.g. above level L as seen in FIG. 1, or it must completely fill the cavity; otherwise the beam patterns of the hydrophone will deviate from the desired cosine pattern. The amount of resonance damping can be adjusted over a wide range by altering the amount of oil or the viscosity of the oil in the canister 41. Raising the oil level increases the damping effect and vice versa. This contrasts with the use of viscoelastic materials in some prior art devices which do not permit much freedom over the amount of damping. It follows from the above description that the damping arrangement as described is common to (shared by) the resonant system defined by the inertial mass 20, the resilient means, i.e. neck 24, the sensing elements and the orthogonally arranged directional channels defined by the latter.

The viscosity of the silicone oil 40 changes much less with changing temperature than other oils thus explaining the reason for its preference. This relative stability of viscosity provides relatively stable resonance control over a wide range of operating temperatures.

Figure 5:
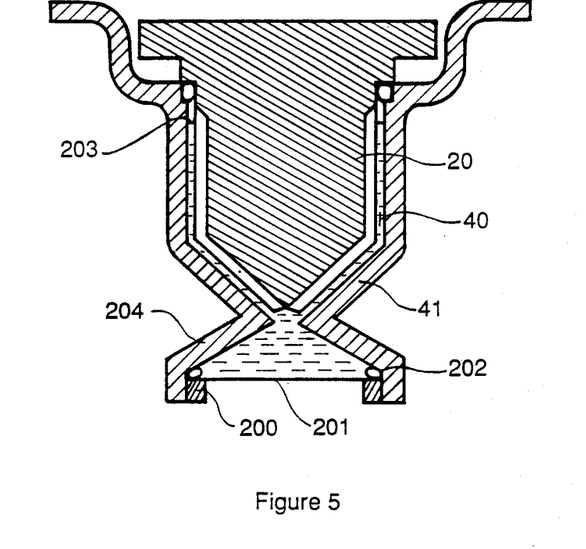
FIG. 5 is a section view of the inertial mass and canister showing a modification providing temperature compensation.

There is another embodiment of the hydrophone that can be used to provide yet more stable resonance control with changing temperature. Referring to FIG. 5, the canister 41 has a reservoir 204 on its conical end. An O-ring 202, a bimetallic metal disk 201 forming the bottom wall of the reservoir, and a retaining ring 200 together form the reservoir 204 and define a cavity that is filled with silicone oil 40. The bimetallic disk 201 is arranged such that an increase in temperature causes the bimetallic disk 201 to become concave upward, thereby raising the oil level 203. The increased oil level provides additional damping, which compensates for the decreased viscosity of oil 40 with the increased temperature. Similarly, a temperature decrease would lower the oil level 203, which would compensate for the increased viscosity of the oil 40. The volume of oil pumped in or out of the reservoir for a specified temperature change can be varied by varying the diameter and thickness of the bimetallic disk 201, and also by using a bimetallic disk of different materials.

The pressure hydrophone comprises a thin piezoelectric ceramic disk 47 fastened with a thin adhesive layer 66 to a flat section of the lower pressure vessel can 26 which is made more compliant at this point by an annular groove 48 surrounding disk 47. Changes in pressure cause flexure of the flat wall section to which the disk 47 is secured thus inducing a voltage difference therein which can be used in the usual manner to provide a pressure-dependent output. The electrical ground is made via the mounting base 21, which is connected to the lower pressure vessel can 26, which in turn is connected to the ceramic disk 47. A wire 49 soldered to the ceramic disk 47 and passing through hole 50 in the mounting base 21 provides the electrical signal connection between the pressure hydrophone and the electronics 37.

The upper pressure vessel can 25 is sealed with the anchor 51, (having clips which extend through the opening and engage the can 25), the annular rubber face seal 52 between anchor 51 and can 25, the rubber gland seal 53, and the electrical wire 55. In sonobuoys, the mechanical attachment to the anchor 51 is made via a piece of rubber tubing 54 passing through the axial passage 56 in the anchor 51 which engages with an internal shoulder located above gland seal 53. The rubber tubing provides vibration isolation from the sonobuoy suspension.

The circuit boards for the electronics 37 are mechanically fastened together with four spaced apart langerons 60, the lower ends of which fit into respective holes 61 in the mounting base 21. The langerons 60 are held in place by the force exerted by upper can 25 on the langeron fingers 64 at the upper ends thereof. The electronics and the circuit boards may be of a conventional nature as noted previously and are not described here.

Figure 8:
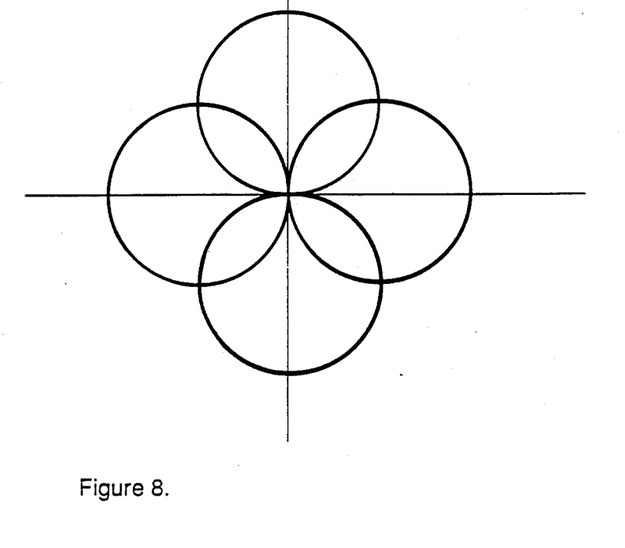
FIG. 8 is a view of a typical cross-dipole receiving pattern.

In operation, an acoustic pressure wave impinging on the pressure vessel accelerates the pressure vessel, and hence the mounting base 21, in the direction of the pressure wave. The radial component of the acceleration causes the inertial mass 20 to pivot relative to mounting base 21, which produces axial displacements of the arms 68–71 of the inertial mass 20. For example, a radial component of acceleration along the axis defined by a line passing through the centers of arms 68 and 70 causes arms 68 and 70 to have opposing axial movements, which produces the same polarity voltage in sensing elements 28 and 30 because of their opposing polarities. That same component of acceleration produces no axial movement of arms 69 and 71 and hence no voltage. Axial components of acceleration of the pressure vessel produce only small deformations of the sensing elements 28–31 because the aluminum neck 24 is stiff; furthermore, the small voltage produced by a sensing element is substantially cancelled by the voltage produced by its partner (eg., sensing elements 28 and 30 produce voltages of opposite sign in response to axial acceleration components, which cancel, depending on how well elements 28 and 30 are matched in sensitivity). The overall system is capable of providing the double "FIG. 8" directivity pattern shown in FIG. 8 thereby to provide the desired signal direction and magnitude information.

Figure 9:
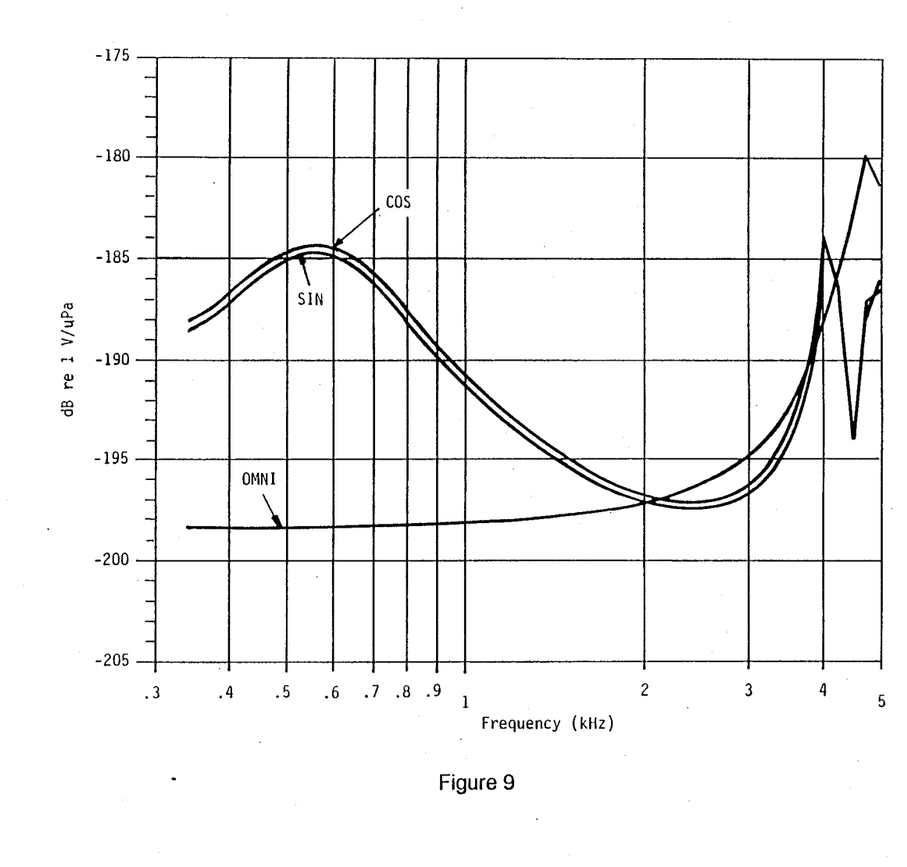
FIG. 9 is a plot showing receiving sensitivity.

FIG. 9 shows the "on-axis" broadside receiving sensitivity of the cosine and sine channels for a preferred embodiment of the invention as described. The receiving sensitivity is measured in dB re 1 V/μPa and the frequency range is 300 to 5000 Hz. The peak in the cosine and sine response near 550 Hz is due to the fundamental resonance of the accelerometers; the peak near 4000 Hz is due to a resonance of the pressure vessel. Of great importance is the fact that the cosine and sine channels have identical shapes; the offset between the curves is due to variations in piezoelectric ceramic sensitivities, which in use are easily accounted for by a gain adjustments in the electronics.

FIG. 9 also shows the receiving sensitivity of the omni(pressure)hydrophone, which has a peak in the response near 4800 Hz due to another resonance in the pressure vessel.

Figure 10:
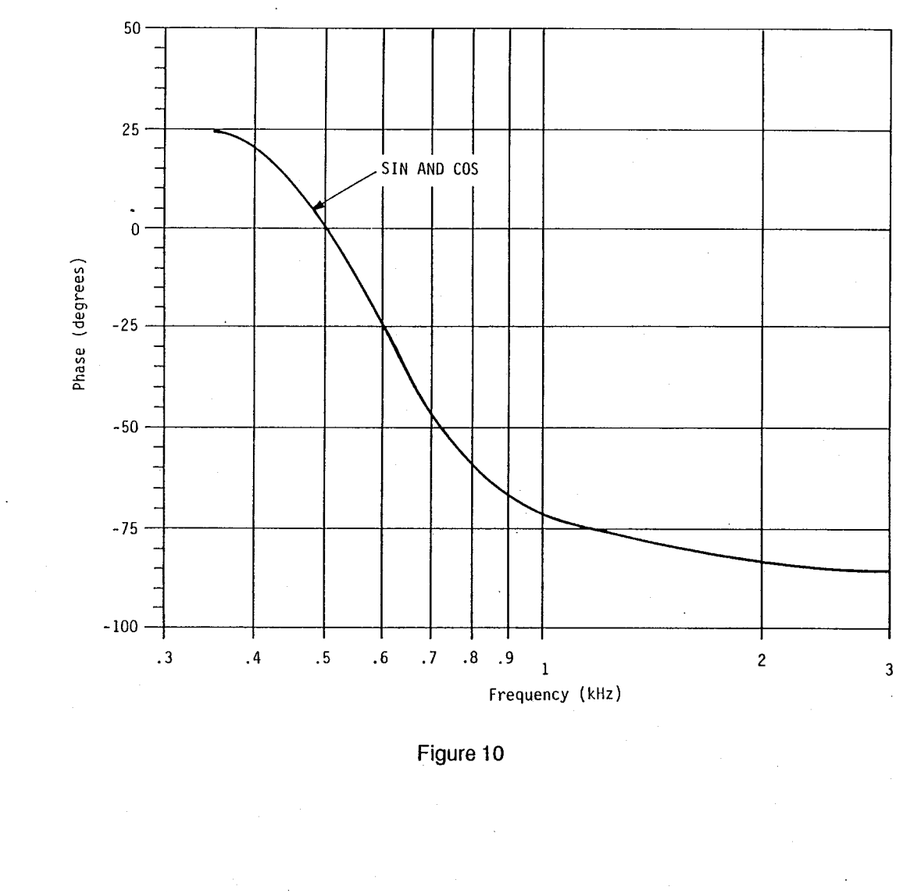
FIG. 10 is a plot of phase vs. frequency.

FIG. 10 shows the phase responses of the sine and cosine channels referenced to the phase of the omni(pressure)hydrophone. The difference in phase between the sine and cosine channels is nil so the two curves appear as one.

Modified Embodiment

Figure 6:
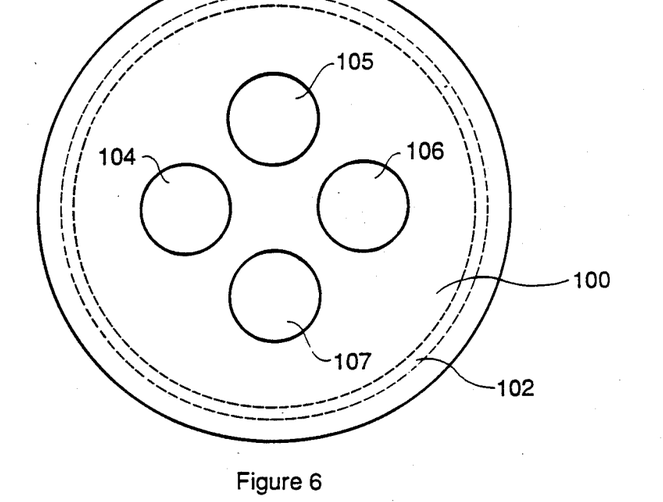
FIGS. 6 & 7 are views of another embodiment of the cross-dipole accelerometer.
Figure 7:
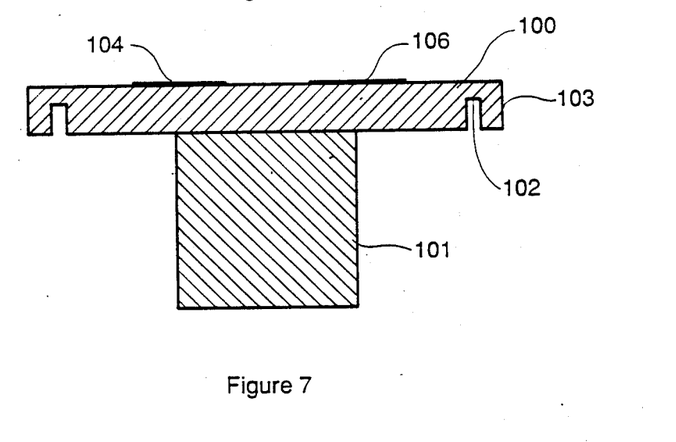

FIGS. 6 & 7 show an alternative embodiment of the accelerometer. Only the accelerometer part of the hydrophone is shown. This embodiment of the invention comprises an inertial mass 101 that is rigidly fastened to a diaphragm 100 with a thin adhesive layer. The radial face 103 of the diaphragm 100 is fastened to the inner pressure vessel walls (this is the part not shown) which in effect forms the mounting base for the inertial mass 101. Four piezoelectric disks 104–107 are fastened to the upper face of diaphragm 100 with solder or a thin adhesive layer. As with the preceding embodiment, the disks must be accurately mounted at 90° intervals or the beam pattern (FIG. 8 pattern) will be imperfect. Furthermore, the disks must be equally spaced from the symmetry axis for reasons which will be readily appreciated by those skilled in this art. Disks 104 and 106 are of opposing polarity, as are disks 105 and 107. Groove 102 produces a desirable boundary condition for diaphragm 100. (One can add a resonance control system as with the previous embodiments; this is not shown in FIGS. 6 & 7).

Radial acceleration of face 103 along an axis defined by a line through the centers of disks 104 and 106 causes diaphragm 100 to deflect with opposing symmetry about an axis defined by a line through the centers of disks 105 and 107. Ideally, disks 105 and 107 produce no voltage; the voltages of disks 104 and 106 are the same sign and are electrically added in parallel as described previously.

SUMMARY OF ADVANTAGES

There have been described above accelerometer-based DIFAR hydrophones that use piezoelectric ceramic as the active sensing material. The embodiments described include the features that (a) the orthogonal accelerometers share an inertial mass and resonance control system, and that (b) the accelerometer's pressure hydrophone, and electronics are all housed within one pressure vessel.

Sharing an inertial mass and resonance control system in the manner described:
  produces excellent sensitivity tracking and phase tracking between directional channels because temperature and other influences affect each directional channel identically.
  produces a high acoustic sensitivity with fewer piezoelectric ceramics because the inertial mass is not divided between the channels. (Size and weight constraints in sonobuoys, and acoustic considerations, place an upper limit on the amount of mass that can be used).
  reduces the number of piece parts, thereby reducing cost, increasing reliability, and alleviating manufacturing problems.

Housing the directional hydrophone, the pressure hydrophone and electronics in a single pressure vessel in the manner described:

reduces flow noise because a single pressure vessel produces less turbulence and is more stable than multiple pressure vessels interconnected with electrical wires and a mechanical suspension.

reduces the number of piece parts, thereby reducing cost, increasing reliability, and alleviating manufacturing problems.

eliminates all but one external electrical wire, thereby minimizing electrical noise and the number of watertight connections for wires entering and exiting pressure vessels.

shields the low-level-signal wires from turbulent water flow by encasing them within a pressure housing. (Water flowing past low-level-signal wires causes them to move, inducing electrical noise, which prevents the detection of very low acoustic signals.)

Other noteworthy features of the preferred embodiment are:

the all-metal thermal pathway between the exterior of the pressure vessel and the piezoelectric sensing elements, The high thermal conductivity so provided may lessen the duration of thermally-induced noise, which occurs when a hydrophone of a certain temperature is immersed in an ocean of a different temperature.

the parallel electrical connection of ceramic elements of opposing polarity providing intrinsic protection against damage to the ceramic due to excessive thermally-induced voltages, thus obviating protection diodes across the ceramics.

Since the invention disclosed herein may be embodied in other specific forms without departing from the spirit or the general characteristics thereof, some of which forms have been indicated, the embodiments described herein are considered in all respects illustrative and not restrictive. One example of an alternative use for the motion sensing transducer (accelerometer) system shown is in a geophone for land-based seismic use. Other applications will become apparent to those skilled in this art. The scope of the invention is indicated by the appended claims, rather than by the foregoing description and all changes which come within the meaning and range of equivalency of the claims are intended to be embraced therein.

We claim:

1. A direction finding, motion-sensitive transducer, comprising:
   (a) an inertial mass;
   (b) means defining a mounting base;
   (c) resilient means interconnecting said inertial mass with said mounting base, said inertial mass extending along a symmetry axis when at rest in a non-accelerated condition, and said resilient means being adapted to permit the inertial mass to wobble relative to the mounting base in radial directions relative to said symmetry axis in response to and in accordance with the direction of components of acceleration of the mounting base which are transverse to the symmetry axis;
   (d) a plurality of sensing elements arranged to respond to the wobbling motion of the inertial mass relative to the mounting base, with said sensing elements being located so as to define multiple directional channels which are adapted to produce outputs dependent on the directions of said acceleration components, and wherein
   (e) said inertial mass, said resilient means and said sensing elements together define resonant systems, and damping means common to said inertial mass, said resilient means, said sensing elements and the multiple directional channels defined by the latter for controlling the resonance of said systems.

2. The apparatus of claim 1 wherein said sensing elements comprise stress-sensitive electrical circuit elements positioned to provide orthogonally arranged directional channels and adapted to respond to the radially directed wobbling oscillations of said inertial mass relative to the mounting base.

3. The apparatus of claim 2 wherein said resilient means interconnecting the inertial mass with said mounting base comprises a neck portion centered with and extending along said symmetry axis and having a length and thickness selected to keep the fundamental resonance frequency of the inertial mass along said symmetry axis above the highest acoustic frequency to be sensed while at the same time said neck portion is sufficiently compliant so as to permit the inertial mass to wobble relative to said mounting base in said radial directions.

4. The apparatus of claim 1 wherein said sensing elements are disposed in equally spaced relation around the symmetry axis and the sensing elements each include a piezo-electric layer secured to a backing which is capable of flexing as said inertial mass wobbles relative to the mounting base.

5. The apparatus of claim 3 wherein said sensing elements are disposed in equally spaced relation around the symmetry axis and mechanical coupling means for effecting flexure of said sensing elements as said inertial mass wobbles relative to said mounting base.

6. The apparatus of claim 3 wherein said sensing elements are disposed in equally spaced relation around the symmetry axis and means for effecting flexure of said sensing elements as said inertial mass wobbles relative to said mounting base, comprising plural means on said inertial mass radially displaced upwardly from the symmetry axis and each contacting a respective one of the sensing elements so that the motions of the inertial mass relative to the mounting base are transmitted to the sensing elements, and the sensing elements having resilience enabling same to flex or deflect in response to said motions.

7. The apparatus of claim 6 wherein the sensing element each include a piezo-electric layer secured to a backing which is capable of flexing as said inertial mass pivots relative to the mounting base.

8. The apparatus of claim 7 wherein both the piezoelectric layer and the backing are disc-shaped, the backing for each sensing element being supported over a pocket or recess in the mounting base to permit the flexing thereof, and said means contacting the respective sensing elements including screw-threaded adjustment means to permit the resonance frequencies of the systems defined by the inertial mass, resilient means and the respective sensing elements to be adjusted and make equal.

9. The apparatus of claim 2 wherein said sensing elements are disposed in equally spaced relation around the symmetry axis, said resilient means comprising a diaphragm-like structure to which both the inertial mass and said sensing elements are affixed so that the wobbling motion of said inertial mass effects flexure and stressing of the sensing elements.

10. The apparatus of claim 2 wherein said sensing elements comprise two orthogonally arranged pairs with the sensors of each pair being of opposite polarity.

11. The apparatus of claim 4, wherein said sensing elements comprise two orthogonally arranged pairs with the sensors of each pair being of opposite polarity and electrically connected in parallel.

12. The apparatus of claim 6 wherein said sensing elements comprise two orthogonally arranged pairs with the sensors of each pair being of opposite polarity and electrically connected in parallel.

13. The apparatus according to claim 1 wherein said damping means for controlling the resonance of said systems includes a canister surrounding said inertial mass but spaced therefrom the canister being fixed rigidly relative to said mounting base, and a fluid of sufficient viscosity as to effect damping of the wobbling motion being located in the space between the canister and the inertial mass.

14. The apparatus according to claim 1 wherein said damping means for controlling the resonance of said systems includes a canister surrounding said inertial mass but spaced therefrom the canister being fixed rigidly relative to said mounting base, and a fluid of sufficient viscosity as to effect damping of the wobbling motion being located in the space between the canister and the inertial mass, and temperature responsive means for changing the amount and hence the level of said fluid in said canister in response to temperature changes thereby to compensate for changes in damping effect due to temperature related viscosity changes in said fluid.

15. The apparatus of claim 2 wherein said damping means for controlling the resonance of said systems includes a canister surrounding said inertial mass but spaced therefrom, the canister being fixed rigidly relative to said mounting base, and a fluid of sufficient viscosity as to effect damping of the wobbling motion being located in the space between the canister and the inertial mass;

16. The apparatus according to claim 6 wherein said damping means for controlling the resonance of said systems includes a canister surrounding said inertial mass but spaced therefrom, the canister being fixed rigidly relative to said mounting base, and a fluid of sufficient viscosity so as to effect damping of the wobbling motion being located in the space between the canister and the inertial mass, and a resilient ring in compression between said canister and the inertial mass providing a force tending to urge the inertial mass into a concentric relationship with said canister.

17. The apparatus according to claim 1 including pressure vessel means encompassing and enclosing the inertial mass, mounting base, resilient means and sensing elements and preventing ingress of water into the interior of the pressure vessel when in use.

18. The apparatus according to claim 6 including pressure vessel means encompassing and enclosing the inertial mass, mounting base, resilient means and sensing elements and preventing ingress of water into the interior of the pressure vessel when in use, said pressure vessel including a pair of opposed cup-shaped seamless, bodies fixed and sealed to said mounting base.

19. The apparatus according to claim 13 including pressure vessel means encompassing and enclosing the inertial mass, mounting base, resilient means and sensing elements and preventing ingress of water into the interior of the pressure vessel when in use, said pressure vessel including a pair of opposed cup-shaped seamless bodies fixed and sealed to said mounting base, one of said seamless bodies encompassing the inertial mass, the sensing elements and the damping means, and the other of said seamless bodies enclosing a region for the mounting of electronic components.

20. The apparatus according to claim 6 including pressure vessel means encompassing and enclosing the inertial mass, mounting base, resilient means and sensing elements and preventing ingress of water into the interior of the pressure vessel when in use, said pressure vessel including a pair of opposed cup-shaped seamless bodies fixed and sealed to said mounting base, one of said seamless bodies encompassing the inertial mass, the sensing elements and the damping means, and the other of said seamless bodies enclosing a region for the mounting of electronic components, wherein said opposed cup-like seamless bodies have mouth portions which sealingly embrace and engage the mounting base, said seamless bodies being constructed such that any resonance frequencies of these bodies are higher than the highest acoustic frequency to be analyzed.

21. The apparatus according to claim 20 wherein one of said seamless bodies includes a pressure sensing element thereon to detect and provide a pressure-dependent output.

22. The apparatus according to claim 2 wherein an all-metal thermal pathway from each of said sensing elements to an exterior portion of the apparatus is provided thereby to reduce thermally induced output signals therefrom.

23. The apparatus according to claim 2 wherein the polarity of said sensing elements and electrical connections therebetween are such as to protect said elements against thermally induced voltages.

* * * * *

UNITED STATES PATENT AND TRADEMARK OFFICE
CERTIFICATE OF CORRECTION

PATENT NO.   :   4,928,263
DATED        :   May 22, 1990
INVENTOR(S)  :   Armstrong, et al.

It is certified that error appears in the above-identified patent and that said Letters Patent is hereby corrected as shown below:

Title page, add

-- Foreign Application Priority Date

December 19, 1988 [CA] Canada 586,276 --

Signed and Sealed this

Twenty-eighth Day of July, 1992

Attest:

DOUGLAS B. COMER

*Attesting Officer*    Acting Commissioner of Patents and Trademarks